Jan. 14, 1958 M. MOSNY 2,819,623
DEVICE FOR THE CONTROL OF THE MOVEMENT OF THE
UNDERCARRIAGE OF AUTOMATIC WELDING MACHINES
Filed Aug. 31, 1955

United States Patent Office 2,819,623
Patented Jan. 14, 1958

2,819,623

DEVICE FOR THE CONTROL OF THE MOVEMENT OF THE UNDERCARRIAGE OF AUTOMATIC WELDING MACHINES

Martin Mosný, Bratislava, Czechoslovakia, assignor of one-half to CKD Ceska Lipa, narodni podnik, Ceska Lipa, Czechoslovakia Application August 31, 1955, Serial No. 531,789

Claims priority, application Czechoslovakia September 4, 1954

2 Claims. (Cl. 74—355)

For the control of the movement of the undercarriage of automatic welding machines a device is to be provided whereby one pair of wheels is driven, as well as a device whereby the direction of travel of the undercarriage ahead or back can be changed or the undercarriage be brought to a standstill. A condition for the proper functioning of such devices is their simple construction with a minimum of backlash as well as the possibility of a reliable control, of the undercarriage movement.

The object of the present invention is a device for the control of the movement of the undercarriage of automatic welding machine, enabling the driving wheels of the undercarriage to be put in, or out of, operation by means of a divided shaft with its ends permanently held apart by the action of a spring in such a way that the shaft is bearing with one of its ends permanently bearing against the gearbox of the worm gear and with its other end against a cam controlled by a hand lever. By turning the cam, the one part of the shaft which is provided with a pair of bevel gears is brought into gear with the pinion of the driving motor. With the cam being in its middle position, the wheels are out of gear. In order to ensure a quiet movement of the undercarriage, the shaft is supported at both ends on steel balls.

Shifting of the gears is rendered possible by a toothed coupling with a spring supported in its axis.

The device for the control of the undercarriage movement in accordance with the present invention can be manufactured in a simple manner, as all mutual positions of the components can be freely adjusted in the course of assembly without the necessity of observing narrow length tolerances.

Figure 1:
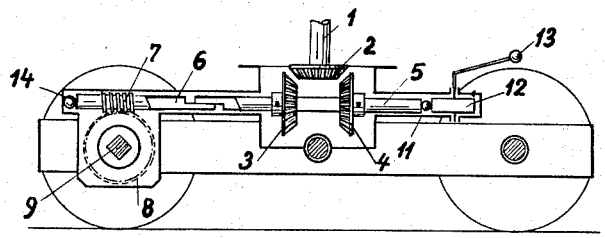
Figure 2:
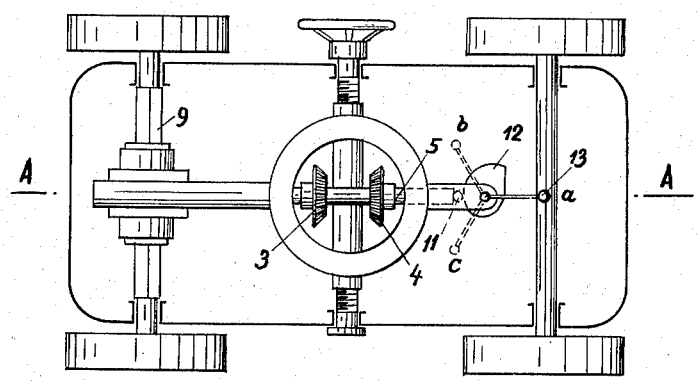
Figures 3, 4:
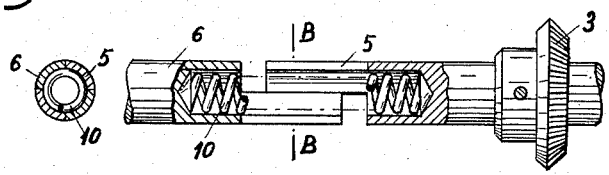

The accompanying drawing illustrates, merely by way of example, an embodiment of the undercarriage movement control device according to the present invention, Fig. 1 showing a longitudinal section of the undercarriage along the plane A—A in Fig. 2. Fig. 2 shows the device in plan view. Figs. 3 and 4 illustrate in detail the points where the shafts are divided, with Fig. 4 being a sectional view along the line B—B of Fig. 3.

From the driving shaft 1 and the bevel gear 2 the movement is transmitted to the bevel gear 3 or 4 which are mounted fixedly on the shaft 5. This shaft is connected shiftably with the other part 6 of the shaft, carrying the worm 7 for the drive of the worm wheel 8 on the axis 9 of the driving wheels of the undercarriage. Both parts 5, 6 are interconnected through a toothed coupling (Fig. 4) and held apart by a spring 10.

The shaft 5 is acting over the ball 11 on the cam 12 controlled by a hand lever 13. In the position $a$ of the hand lever the bevel gears 2, 3, 4 are out of gear, in the position $b$ of the hand lever, the gear 2 is in gear with the gear 4 in the position $c$ of the lever the gear 3 is in mesh with the gear 2.

The other part 6 of the shaft 5 bears with its front against the ball 14 and casing of the worm wheel, thus ensuring a minimum frictional resistance of the shiftable shaft.

I claim:

1. A reversing transmission for the carriage of a movable automatic welder having a pair of driven wheels on a common driven axle; comprising a two-part transmission shaft arranged with its axis at right angles to the axis of said driven axle, one part of said transmission shaft having first and second bevel gears fixed thereon at spaced apart locations and facing toward each other, a drive shaft extending at right angles to said transmission shaft and having a third bevel gear fixed thereon and disposed between said first and second bevel gears for alternative and selective meshing engagement with the latter in response to axial displacement of said one part of the transmission shaft, worm gear means on the other part of said transmission shaft and on the driven shaft for rotating the latter in response to rotation of said other part, the adjacent ends of said one part and said other part of the transmission shaft having complementary circumferential cutouts of substantial axial length to define a claw coupling therebetween causing rotation of said other part with said one part while permitting axial displacement of the latter independent of said other part, said adjacent ends of the parts of said transmission shaft having axial recesses opening toward each other, helical spring means in said recesses urging said one part axially away from said other part, first thrust bearing means acting against the end of said other part remote from said one part to prevent axial displacement of said other part by said spring means, second thrust bearing means acting against the end of said one part remote from said other part, and control means acting upon said one part of the transmission shaft through said second thrust bearing means to axially displace said one part in opposition to said spring means.

2. A reversing transmission as in claim 1; further comprising a housing containing said transmission shaft and control means, said control means including a radial cam rotatable about an axis at right angles to said axis of the transmission shaft, said first and second thrust bearing means consisting of ball bearings seated axially between said other part of the transmission shaft and the adjacent end of the housing and between said radial cam and said one part of the transmission shaft, respectively.

References Cited in the file of this patent

UNITED STATES PATENTS

| 1,063,874 | Hall | June 3, 1913 |
| 1,237,158 | Bottger | Aug. 14, 1917 |
| 1,520,887 | Randles | Dec. 30, 1924 |
| 1,680,492 | Anderson | Aug. 14, 1928 |
| 2,190,856 | Young | Feb. 20, 1940 |